United States Patent [19]

Rakiec

[11] Patent Number: 4,826,344
[45] Date of Patent: May 2, 1989

[54] CORNER PLATE FOR ACCESS PANEL

[75] Inventor: Dennis B. Rakiec, Grosse Pointe Woods, Mich.

[73] Assignee: Harry Major Machine and Tool Co., Fraser, Mich.

[21] Appl. No.: 156,932

[22] Filed: Feb. 17, 1988

[51] Int. Cl.[4] ............................................. F16B 1/00
[52] U.S. Cl. .................................... 403/205; 403/382
[58] Field of Search ............... 403/205, 382, 401–403; 408/710; 409/134

[56] References Cited

U.S. PATENT DOCUMENTS

| 138,611 | 5/1873 | Callanan . | |
|---|---|---|---|
| 933,067 | 9/1909 | Ferry | 403/205 |
| 1,595,648 | 8/1926 | Corley . | |
| 1,957,362 | 5/1934 | Smith | 403/205 |
| 2,947,391 | 8/1960 | Wayne | 403/403 |
| 4,290,251 | 9/1981 | Graham | 52/656 |
| 4,477,990 | 10/1984 | Buchanan | 40/155 |
| 4,502,260 | 3/1985 | Machler | 52/656 |
| 4,702,638 | 10/1987 | Zalesak | 403/403 |

FOREIGN PATENT DOCUMENTS

| 8003184 | 1/1982 | Netherlands | 403/205 |
|---|---|---|---|
| 0646594 | 12/1984 | Switzerland | 403/403 |
| 1096004 | 12/1967 | United Kingdom | 403/403 |

Primary Examiner—William L. Sikes
Assistant Examiner—B. Randolph Holloway
Attorney, Agent, or Firm—Basile and Hanlon

[57] ABSTRACT

An access panel employing an expanded metal panel having its peripheral edges seated in framing strips of U-shaped cross section is assembled by the use of a pair of opposed corner plates of a relatively soft, non-metallic material formed with recesses which enclosingly receive and orient the end portions of framing strips at each corner of the panel. Fastening members, such as rivets or nut and bolt units, fixedly clamp the opposed corner plates against the opposite sides of the panel-framing strip assembly.

4 Claims, 1 Drawing Sheet

CORNER PLATE FOR ACCESS PANEL

BACKGROUND OF THE INVENTION

Field of the Invention

The present invention is directed to an access panel or safety panel of the type employed in industrial machines to shield moving parts from workers while the machine is in operation. The panels are removably mounted on the machine so that, upon removal, access is provided to the adjacent portions of the machine.

Typically, the access panels are of rectangular configuration and consist of a panel of expanded sheet metal whose peripheral edges are seated in framing strips having a U-shaped, transverse cross section defining a relatively deep recess of a width substantially equal to the thickness of the expanded metal panel. The frame members extend the entire length of each edge of the panel and are formed at their ends with a 45 degree bevel. The beveled end edges of adjacent strips are then welded to each other.

Typically, the panel, when installed in the machine, simply rests upon mounting brackets.

The present invention is directed to an access panel which can be readily assembled without requiring the framing strips to be accurately beveled for welding to each other and which eliminates the direct metal-to-metal contact between the framing strips and machine mounting bracket, thereby minimizing vibration noise when the panel is in place.

SUMMARY OF THE INVENTION

In accordance with the present invention, after an expanded metal sheet is cut to the desired dimensions, framing strips are cut with squared ends to collectively enclose the peripheral edge of the expanded metal panel. At each corner of the assembly, a pair of corner plates are formed from a suitable rigid material, such as polypropylene, nylon or metal and employed to fixedly assemble the strips and expanded metal panel to each other.

The corner plates at each corner are intended to be clamped to each other in opposed, face-to-face relationship, as by bolts or rivets. The opposed inner faces of each corner plate are formed with first and second grooves so conformed and dimensioned as to define a recess to snugly enclose the end portions of adjacent framing strips at each corner of the panel. Fasteners (rivets or bolts) pass through the two corner plates, one fastener also passing through one of the forming strips and the panel, another fastener also passing through the other framing strip and the panel, and a third fastener passing through both corner plates and the panel at the inner side of the corner.

When assembled, the edges of the thermoplastic corner plates are spaced outwardly beyond the edges of the framing strips, and the thickness of the assembled corner plate is substantially greater than that of the framing strips. Thus, the corner plates may be received in brackets mounted on the machine to support the metal framing strips and expanded metal panel clear of metal to metal contact with the machine.

Other objects and features of the invention will become apparent by reference to the following specification and to the drawings.

DESCRIPTION OF THE PREFERRED EMBODIMENTS

Figure 1:
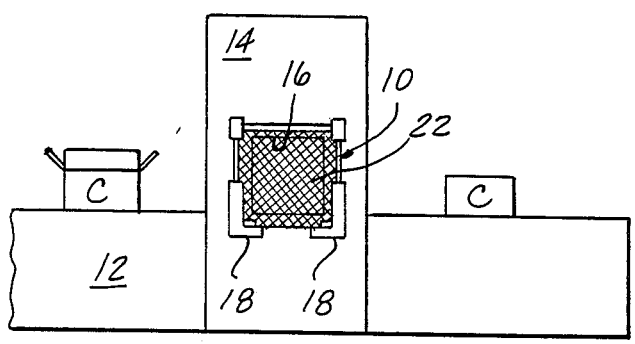
FIG. 1 is a side elevational view of a typical installation employing an access panel of the type with which the present invention is concerned.

In FIG. 1 there is shown a simplified sketch of a typical installation employing an access panel designated generally 10 of the type of which the present invention is concerned. In the installation of FIG. 1, cartons C are fed along a conveyor 12 from left to right as viewed in FIG. 1, to pass through a carton closer 14 which closes the flaps of the cartons. The housing of carton closer 14 is provided with an access opening 16 to provide access to various operating elements of the machine. For safety purposes, during normal operation of the machine, the access opening 16 is closed by the access panel 10 which is removably mounted on the machine housing, as by brackets 18 and hooks (not shown) on the inner side of the top of the panel, so that the panel may be disengaged from the housing by sliding it upwardly clear of the brackets. Such panels are employed on a wide variety of industrial machines.

Typically, such panels are constructed from a panel of expanded sheet metal 22 whose peripheral edges are enclosed by metal framing strips 20 having a relatively narrow and deep, U-shaped, transverse cross section (see FIG. 4) which defines a relatively deep recess having a transverse width which will snugly receive the thickness of the expanded metal panel 22. The frame strips 20 provide some additional rigidity to the assembled panel and also enclose the edges of the expanded metal panels 22 which are quite jagged when the panel is cut to size.

Figure 5:
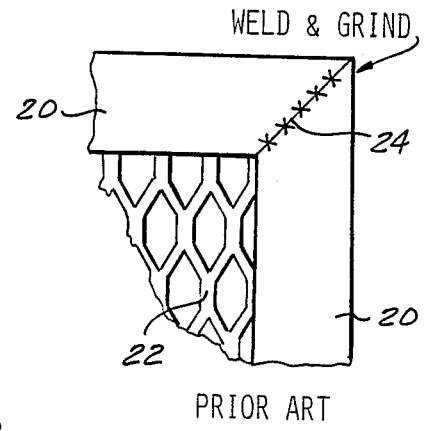
FIG. 5 is a front view of a corner portion of a prior art access panel.

The conventional manner of making such panels is indicated in FIG. 5. Although FIG. 5 shows only one corner of a panel, it will be appreciated that the framing strips 20 are cut to length to match the length of the respective edges of the expanded metal panel 22. As indicated in FIG. 5, the prior art procedure involves the cutting of framing strips 20 with a beveled edge, as at 24, at each end of the strip. To achieve the desired mating fit at each corner, the edges 24 at the opposite ends of a strip 20 must be cut at a fairly precisely measured distance from each other. After being placed in position on panel 22, the edges of adjacent strips 20 are welded to each other along the beveled edges 24. It is necessary to perform this welding on both sides of the panel and, after the welding is completed, it is necessary to grind down the weldment to form a smooth surface at the joint. Because the panels are not a high-volume item, it is not economically practical to attempt to automate their production; and yet, as is apparent from the foregoing discussion, a substantial amount of hand labor is involved in producing the panels.

Figure 4:
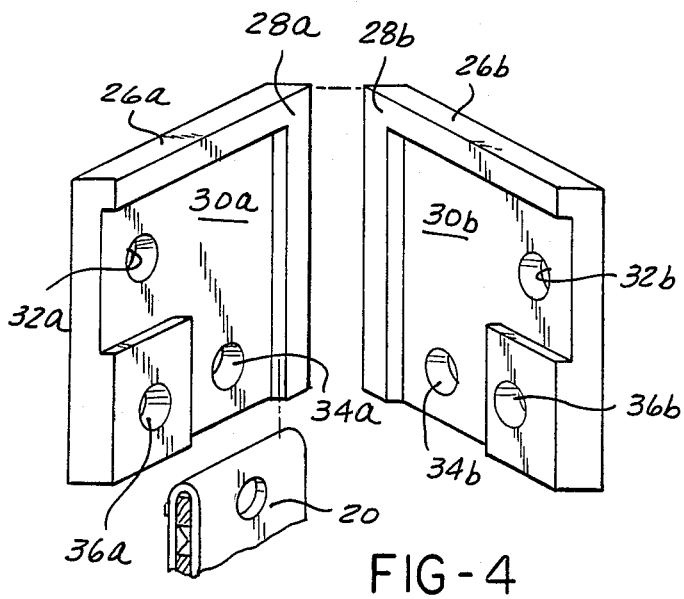
FIG. 4 is an exploded perspective view showing the inner faces of a pair of corner plates employed in the present invention, together with an end portion of a framing strip.

In accordance with the present invention, the framing strips 20 are assembled to the expanded metal panel by the use of pairs of corner plates 26a, 26b (see particularly, FIG. 4). The corner plates 26a and 26b are mirror images of each other and may be formed from a suitable rigid material. Such material may consist of metal or polymers, such as polypropylene, nylon or other thermoplastic material, which may be produced by an injection molding process. As best seen in FIG. 4, the inner surfaces 28a, 28b of the respective corner plates 26a, 26b are formed with flat-bottomed grooves 30a, 30b. The grooves will vary in configuration dependent upon the angle formed between the adjacent frame strips whch may vary with application. The depth and dimensions of grooves 30a, 30b are such that when the inner faces 28a, 28b of the two corner plates 26a, 26b are in substantial face-to-face relationship, the end portions of two adjacent frame strips 20 can be received snugly within the recess cooperatively defined by the grooves 30a, 30b in the two plates.

Figure 2:
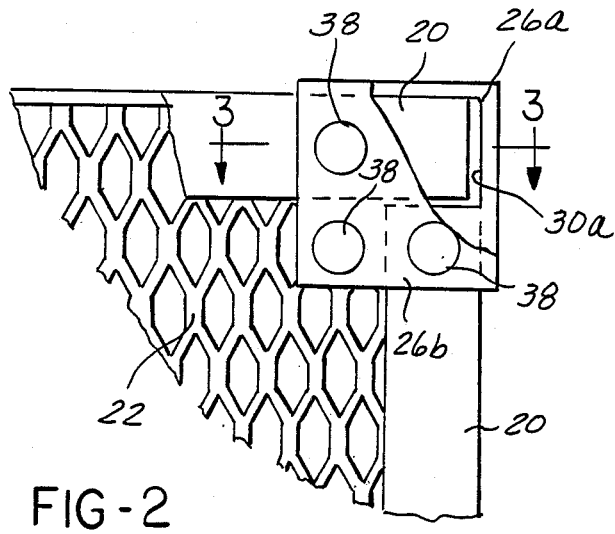
FIG. 2 is a detail front elevational view of a corner portion of an access panel embodying the present invention with certain parts broken away or shown in section.

Corner plates 26a and 26b are formed with three fastener receiving bores, two of which, 32a, 32b or 34a, 34b, pass through the respective arms of grooves 30a or 30b. A third hole 36a or 36b pass through each corner plate at the inside corner of the groove. These holes are so dimensioned as to pass the shank of a fastener element, such as a rivet 38 (see FIGS. 2 and 3) or bolt, employed to place the corner plates 26a, 26b, framing strips 20, and expanded metal panel 22 into assembled relationship with each other.

Where the corner plates 26a, 26b are employed, as best seen in FIG. 2, the framing strips 20 may be cut to length with a simple squared end. Further, it is not necessary that the length to which the framing strips 20 are cut be precisely measured. All that is necessary is to avoid cutting the framing strips 20 too long—the length of the strip as cut may be as much as ¼ inch or much shorter than its intended length without affecting the assembly.

Figure 3:
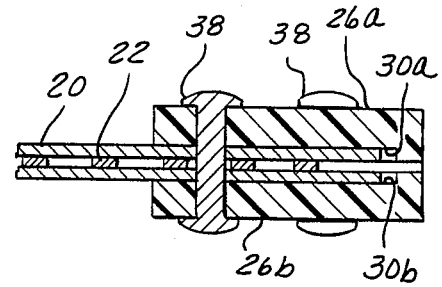
FIG. 3 is a cross-sectional view taken on line 3—3 of FIG. 2.

In assembling the panel of the present invention, the framing strips 20 are positioned on the various edges of expanded sheet metal panel 22. A pair of corner plates is then positioned at opposite sides of the assembly with the adjacent framing strips 20 located within the grooves 30a, 30b of the corner plates. The holes 32a, 34a, 36a may then be employed as a guide for a drill which will drill aligned bores through the respective framing strips 20 and panel 22. Bolts or rivets 38 are then installed, as best seen in FIG. 3, to fixedly secure the assembly together.

While one embodiment of the invention has been disclosed and described in detail, it will be apparent to those skilled in the art that the disclosed embodiment may be modified. Therefore, the foregoing description is to be considered exemplary rather than limiting, and the true scope of the invention is that defined in the following claims.

What is claimed is:

1. In an access panel including a peripheral frame of elongate frame members of a U-shaped, transverse cross section defining a relatively narrow and deep recess, a main panel of expanded sheet metal having its peripheral edges received within the recesses of said frame members with each frame member extending substantially the entire length of an edge of the main panel, and means joining the adjacent ends of adjacent frame members at the corner juncture of adjacent edges of said main panel;

the improvement wherein said means joining the adjacent ends of adjacent frame members comprises a pair of joined opposed, flat corner plates with inner faces and made of a rigid material having a combined thickness greater than the transverse thickness of said frame members, means defining first and second grooves in the opposed inner faces of said plates, the grooves in the pair of plates being dimensioned to cooperatively receive and enclose the adjacent end portions of adjacent frame members at the juncture of adjacent edges of said main panel when said inner faces are in substantial face-to-face engagement with each other, means defining a first and a second bore through each of said plates respectively opening into said first and second grooves, means defining a third bore in each of said frame members in the end portions of the frame member, and fastening means projecting through the first and second bores in said opposed plates and the bores in the end portions of the frame members received in said first and second grooves and said panel fixedly securing said plates, frame members and panel in assembled relationship with each other.

2. The invention defined in claim 1 wherein said fastening means further comprises a third fastener extending transversely through both of said plates and said main panel only.

3. The invention defined in claim 1 wherein said rigid material comprises a rigid polymeric material.

4. The invention defined in claim 1 wherein said rigid material comprises metal.

* * * * *